United States Patent [19]

Siegenthaler et al.

[11] Patent Number: 4,747,765

[45] Date of Patent: May 31, 1988

[54] MOBILE TIRE CURING UNIT

[75] Inventors: Karl J. Siegenthaler, Rome, Italy; Robert Schlemmer, Riehem, Switzerland

[73] Assignee: The Firestone Tire & Rubber Company, Akron, Ohio

[21] Appl. No.: 50,660

[22] Filed: May 18, 1987

[30] Foreign Application Priority Data

May 20, 1986 [IT] Italy .................. 067417 A/86

[51] Int. Cl.[4] .................. B29C 33/04; B29C 35/02
[52] U.S. Cl. .................. 425/42; 425/50; 425/52
[58] Field of Search .................. 425/28 R, 40, 44, 45, 425/48, 52, 58, 33, 35, 41, 42, 38, 50, 23

[56] References Cited

U.S. PATENT DOCUMENTS

| | | | |
|---|---|---|---|
| 1,588,668 | 6/1926 | Fairchild | 425/40 |
| 2,822,576 | 2/1958 | Rowe, Jr. | 425/23 |
| 2,970,346 | 2/1961 | Fannen | 425/28 |
| 3,574,893 | 4/1971 | Balle | 425/23 |
| 3,579,736 | 5/1971 | Balle et al. | 425/38 |
| 3,770,931 | 11/1973 | Gilliatt | 425/41 |
| 3,854,852 | 12/1974 | Carter | 425/28 R |
| 3,976,409 | 8/1976 | Athey | 425/33 |
| 4,400,342 | 8/1983 | Logan | 425/28 R |
| 4,525,320 | 6/1985 | Sarumaru | 264/502 |
| 4,545,750 | 10/1985 | Sarumaru | 425/32 |

FOREIGN PATENT DOCUMENTS

| | | | |
|---|---|---|---|
| 1076323 | 4/1986 | Japan | 425/52 |
| 2157224 | 10/1985 | United Kingdom | |
| 251814 | 1/1970 | U.S.S.R. | |
| 596473 | 4/1976 | U.S.S.R. | |
| 442081 | 4/1976 | U.S.S.R. | |

Primary Examiner—Willard Hoag
Attorney, Agent, or Firm—Ernst H. Ruf

[57] ABSTRACT

A mobile tire curing unit having top and bottom mold halves interconnectable in releasable manner so as to define an annular chamber for receiving a green tire, with one of the mold halves incorporating a closed circuit for a given curing media supply under pressure, the circuit being defined by a deformable curing bladder, designed to occupy the annular chamber, and by a casing connectd to the inner tube by a heated supply duct and a return duct; the casing also housing a powered fan for circulating the curing media inside the closed circuit, and the circuit being externally chargeable via an inlet valve.

5 Claims, 1 Drawing Sheet

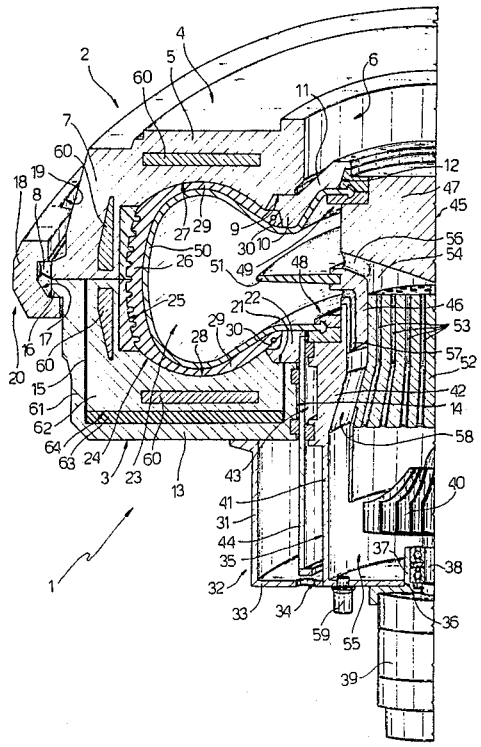

MOBILE TIRE CURING UNIT

TECHNICAL FIELD

The present invention relates to a mobile tire curing unit.

BACKGROUND OF THE ART

Tire curing systems are known to generally present one or more molds, each comprising a top and bottom mold half, defining an annular chamber for a green tire. The top mold half is usually connected to a moving crosspiece on the press, whereas the bottom mold half is mounted on the bed of the press and supports a deformable inner tube or curing bladder designed to occupy the said annular chamber when inflated with a heat-exchanging medium or media such as gas. The said gas, usually consisting of relatively hot steam, is supplied under pressure by an external feeder, which provides for heating the gas and circulating it under pressure inside the mold for the length of time required for curing.

A major drawback of known systems of the aforementioned type is that they involve relatively high manufacturing cost and provide for relatively low output. Such systems, in fact, require a relatively high-cost press for every one or two molds, which press remains engaged throughout the entire curing operation.

To overcome this drawback, systems have been devised comprising a number of molds mounted in a fixed manner on an indexing fixture which, turning about a fixed vertical axis, feeds the molds, one by one, through a loading station where each mold is opened, loaded and closed by a fastening device on the mold itself. The mold is then turned on the indexing fixture and supplied, as long as required for curing, with heat-exchanging gas fed under pressure from a centralized feeding device connected to all the molds on the indexing fixture.

Though systems of the aforementioned type involve no presses and provide for using a large number of molds at the same time, they are nevertheless extremely expensive in that they require a separate system for heating and supplying gas under pressure, as well as a number of sliding joints for connecting each moving mold to the said system.

Furthermore, the said indexing fixture, to which the bottom part of each mold is connected integrally, imposes the same curing time for each mold, with no possibility of selective curing.

DISCLOSURE OF THE INVENTION

The aim of the present invention is to provide a mobile curing unit which may be rendered thoroughly independent of any external facility throughout the curing operation.

In particular, the aim of the present invention is to provide a mobile curing unit comprising a mold which, once loaded with a green tire and held closed by fastening devices, involving no presses, and provides for fully independent curing of the tire, regardless of the curing process undergone by other tires in any similar units.

According to the present invention, there is provided a mobile tire curing unit comprising a mold, in turn, comprising a top mold half, a bottom mold half and means for interconnecting the said two molds halves in a releasable manner; the said two mold halves combining to define an annular chamber for receiving a green tire; characterized by the fact that it also comprises a closed circuit for a given supply of fluid curing medium or media under pressure, the said circuit being carried on a first one of the said mold halves and comprising a deformable curing bladder, designed to expand inside the said annular chamber, a casing, and supply and return duct means for the said curing media, said duct means interconnecting the said curing bladder and the said casing; power ventilating means being housed inside the said casing, for force circulating the said curing media inside the said closed circuit; an inlet valve for the said curing media supply being provided on the said closed circuit; and heating mean being connected to at least part of the said closed circuit, for heating the said curing media supply.

A non-limiting arrangement of the present invention will now be described with reference to the attached drawing.

BRIEF DESCRIPTION OF THE DRAWING

The single drawing is a perspective view of a half axial section of a mobile tire curing unit in accordance with the present invention.

BEST MODE FOR CARRYING OUT THE INVENTION

In the drawing, number 1 indicates a mobile tire curing unit comprising a mold 2, in turn, comprising a bottom mold half 3 and a top mold half 4.

Top mold 4 is annular in shape and presents a substantially L-shaped radial half section defined by an annular top end wall 5 having a central axial hole 6, and by a substantially cylindrical side wall 7 extending downwardly from the outer edge of top wall 5. From the bottom end of wall 7, there extend outwardly a number of teeth 8 each tapered circumferentially in the form of a wedge. On its inner edge, wall 5 presents a bottom groove 9 inside which is fitted the outer edge of an annular body 10, the inner edge of which consists of a truncated-cone body 11 having an axial through hole 12 coaxial with hole 6.

Bottom mold half 3 is also annular in shape and presents a substantially L-shaped annular half section defined by an annular bottom end wall 13 with a center through hole 14 coaxial with hole 6, and by a substantially cylindrical side wall 15 extending upwardly from the outer edge of bottom wall 13. From the top end of wall 15, there extends outwardly an annular flange 16 housed inside an inner annular groove 17 on outer ring 18. The inner annular top edge of ring 18 presents a number of slots 19 each enabling entry of a respective tooth 8 inside groove 17. The height of groove 17 is such as to form, via rotation of ring 18 in relation to mold halves 3 and 4 arranged facing and contacting each other, a bayonet joint 20 enabling the releasable connection of mold halves 3 and 4.

On its inner edge, wall 13 presents a top annular groove 21 defining a supporting seat for an annular body 22.

When connected, mold halves 3 and 4 define an annular chamber 23 having a substantially C-shaped section with its concave side facing the axis of holes 6 and 14. Chamber 23 is designed to house a green tire 24 arranged coaxial with holes 6 and 14. The inner surface of chamber 23 is defined by a cylindrical insert 25, bearing the impression of a tire tread and extending along the inner surfaces of side walls 7 and 15, and by two curved annular surfaces, 27 and 28, arranged facing each other and extending respectively along walls 5 and 13 and designed to contact respective side walls 29 of tire 24. The two annular bodies 10 and 22 define two grooves, each designed to house a respective bead 30 of tire 24.

To the bottom outer surface of wall 13 on bottom mold half 3 is connected the top flanged end of a side wall 31 on a bell 32 coaxial with hole 14. An end wall 33 on bell 32 presents a number of through holes 34 and supports a bottom portion of a substantially cylindrical casing 35.

Casing 35 is arranged coaxial with hole 14 and presents a bottom center hole 36 engaged by a hub 37 through which is mounted, in a rotary manner, a shaft 38 from an electrical motor 39 integral with casing 35 and powering a fan 40 located inside a bottom portion of casing 35 and fitted onto shaft 38.

Casing 35 comprises a substantially cylindrical side wall 41 a top portion 42 of which engages, in a radially slack manner, hole 14, in such a manner as to define, with the inner surface of the same, an annular sliding slit 43 for a tubular cylindrical piston 44, the outside diameter of which is smaller than the inside diameter of tire 24. Piston 44 faces holes 34 at the bottom and is connected, at the top, to annular body 22 which simply rests inside groove 21 and acts as a stop for arresting the downward axial slide of piston 44 inside bell 32.

Casing 35 is closed at the top by a cap 45 comprising a side wall 46 partially engaged inside the top portion 42 of side wall 41, and an end wall 47, the top end of which engages center hole 12 on annular body 10.

The top portion 42 of wall 41 and wall 47 are fitted respectively with a bottom annular fastening element 48 and a top annular fastening element 49 for respectively fastening the top and bottom edges of an annular inner tube or curing bladder 50 made of elastomer, having a substantially C-shaped radial half section and designed to expand, inside annular chamber 23, thus contacting the inner surface of tire 24.

Annular fastening elements 48 and 49 present respective outside diameters smaller than the inside diameter of tubular piston 44 and the diameter of hole 6, and are separated by a flat annular lip 51 made of elastomer, the outer edge of the said lip 51 extending centrally inside chamber 23, and the inner edge being secured to the outer surface of wall 46 on cap 45.

Wall 46 is fitted internally with a heating element 52 having a number of through axial channels 53 and dividing the space inside casing 35 into a top chamber 54 and a bottom chamber 55. Top chamber 54 communicates with the space inside inner tube 50 via a ring of holes 56 formed through wall 46 over lip 51, whereas the space inside inner tube 50 communicates with bottom chamber 55 via a ring of holes 57 formed through wall 46 below lip 51.

Chamber 55, housing fan 40, defines, together with channels 53, chamber 54, holes 56, the space inside inner tube 50 and holes 57, a pneumatic circuit 58 for circulating a given supply of heat-exchanging gas injected externally through a supply valve 59 mounted on the bottom wall portion of casing 35.

Inside walls 5 and 7 on top mold half 4, and walls 13 and 15 on bottom mold half 3, there extend electrical heating resistors 60 connected, together with heating element 52 and motor 39, to an external electrical power source (not shown).

For ensuring efficient sealing at all times during curing, between mold halves 3 and 4, bottom mold half 3 is formed in two annular pieces 61 and 62, the first consisting of a cup-shaped outer element and being provided with annular flange 16, and the second consisting of a torus constituting the bottom mold half proper. Torus 62 is mounted inside annular piece 61 so as to slide towards mold half 4 under the thrust of a flexible compensating member 63 housed inside a variable-volume annular chamber 64 defined between the lower surface of torus 62 and the upper surface of the end wall of annular piece 61.

In the example shown, flexible member 63 consists of a layer of flexible material which may obviously be replaced, in variations not shown, for example, by set springs or gas under pressure.

Operation of curing unit 1 will now be described starting from the loading position, in which top mold half 4, located in a loading and unloading station (not shown), is held raised over bottom mold half 3 by a lifting device (not shown), and piston 44 is held raised by actuators (not shown) operating upwardly through holes 34.

For a detailed description of a loading and unloading station as well as a tire curing system embodying the mobile tire curing unit of the present invention, reference should be made to co-pending U.S. application Ser. No. 07/050,661, filed concurrently herewith by the Assignee of the present invention, and which is incorporated herein by reference in the interest of full disclosure.

In the said loading position, raised piston 44 deforms inner tube 50 in such a manner as to hold it, together with lip 51, turned upwards with an outer edge portion projecting over the top of fastening device 49 and within a space the outside diameter of which is smaller than the inside diameter of a green tire 24.

A green tire 24 is then placed horizontally over open bottom mold half 3, and arranged so as to rest bottom bead 30 on annular body 22. Subsequent downward movement of piston 44 causes tire 24 to rest on bottom mold half 3, and elastomeric lip 51 to snap inside tire 24 and so insert inner tube 50 inside the same. Insertion of the inner tube inside tire 24 is usually assisted by injecting relatively low-pressure air inside circuit 58 through valve 59.

Top mold half 4 is then lowered onto bottom mold half 3, causing annular body 10 to seat on top bead 30, with mold halves 3 and 4 thus fully enveloping tire 24.

Top mold half 4 is connected firmly in a fluid tight manner to bottom mold half 3 by means of bayonet joint 20. A given supply of relatively high-pressure heat-exchanging medium, preferably nitrogen gas, is then fed into chamber 55, through valve 59, and circulated inside circuit 58 by fan 40. In more detail, gas is supplied from chamber 55 to the space inside inner tube 50 along a supply route defined by heated channels 53 and holes 56, and back to chamber 55 along a return route defined by holes 57.

At this point, unit 1 is connected solely to an external electrical power source (not shown), the function of which is to keep motor 39, heating element 52 and resistors 60 operating in a predetermined manner, and to circulate gas under pressure, and heated to a given temperature, inside closed pneumatic circuit 58 for the length of time required for curing tire 24.

After curing, unit 1 is set up in the said loading and unloading station, where bayonet joint 20 is opened, top mold half 4 removed and piston 44 moved up. Upward movement of piston 44 not only deforms inner tube 50 and lip 51, but also causes now freshly cured tire 24 to be pushed out of mold half 3 by virtue of annular body 22 which, in this case, acts as an extractor.

The advantages of curing unit 1 as compared with known curing systems will be clear from the foregoing description.

Firstly, it involves no permanent connection to an external production, heating or pressure gas supply system. Furthermore, once loaded and closed at the said operating station, unit 1 is fully independent of the loading station and may be stored in any appropriate place for any length of time required for curing.

From the forgoing description and the operational discussion, when read in light of the several drawings, it is believed that those familiar with the art will readily recognize and appreciate the novel concept and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to various modifications, changes or the like without departing from the spirit and scope of the invention with the latter being determined solely by reference to the claims appended hereto.

What is claimed is:

1. A mobile tire curing unit comprising a mold, in turn comprising a top mold half, a bottom mold half and means for interconnecting the said two molds halves in a
    releasable manner; the said two mold halves combining to define an annular chamber for receiving a green tire; the tire curing unit further comprising means defining a closed circuit for a given supply of fluid curing medium under pressure, the said circuit means being carried on a first one of the said mold halves and comprising a deformable curing bladder, designed to expand inside the said annular chamber, a casing, and supply and return duct means for the said curing medium, said duct means interconnecting the said curing bladder and the said casing; power ventilating means being housed inside the said casing, for force circulating the said curing medium inside the said closed circuit; an inlet valve for the said curing medium supply being provided on the said closed circuit means; and heating means being connected to at least part of the said closed circuit means, for heating the said curing medium supply.

2. A curing unit as claimed in claim 1, wherein said curing bladder is connected integrally to the said casing; piston means moving axially along the said casing being provided for moving the said curing bladder from a normal operating position, wherein the said curing bladder extends radially outwardly of the said casing, into a deformed position, wherein the said inner tube extends substantially parallel with the axis of the said casing.

3. A curing unit as claimed in claim 2, wherein said piston means comprise a tubular piston, the inside diameter of which is larger than the inside diameter of the said curing bladder, and the outside diameter of which is smaller than the inside diameter of a green tire.

4. A curing unit as claimed in claim 3, wherein said tubular piston comprises an annular end body defining an inner surface portion of the said first mold half; the said annular body moving together with the said piston and acting as an extracting element for extracting the said tire from the said first mold half.

5. A curing unit as claimed in claim 2, further including a deformable annular lip extending radially outwardly of the said casing and inside the said curing bladder.

* * * * *